US005874669A

United States Patent [19]
Ray

[11] Patent Number: 5,874,669
[45] Date of Patent: Feb. 23, 1999

[54] SCANNING FORCE MICROSCOPE WITH REMOVABLE PROBE ILLUMINATOR ASSEMBLY

[75] Inventor: David J. Ray, Mendon, N.Y.

[73] Assignee: Raymax Technology, Inc., Agoura Hills, Calif.

[21] Appl. No.: 951,365

[22] Filed: Oct. 16, 1997

[51] Int. Cl.⁶ .................................................. G01B 5/28
[52] U.S. Cl. .................................................. 73/105
[58] Field of Search ............................ 73/105; 250/306, 250/307

[56] References Cited

U.S. PATENT DOCUMENTS

| | | | |
|---|---|---|---|
| Re. 34,489 | 12/1993 | Hansma et al. | 250/306 |
| Re. 35,514 | 5/1997 | Albrecht et al. | 250/307 |
| 4,935,634 | 6/1990 | Hansma et al. | 250/306 |
| 5,025,658 | 6/1991 | Elings et al. | 73/105 |
| 5,144,833 | 9/1992 | Amer et al. | 73/105 |
| 5,189,906 | 3/1993 | Elings et al. | 73/105 |
| 5,231,286 | 7/1993 | Kajimura et al. | 250/306 |
| 5,245,863 | 9/1993 | Kajimura et al. | 73/105 |
| 5,260,824 | 11/1993 | Okada et al. | 250/306 |
| 5,388,452 | 2/1995 | Harp et al. | 73/105 |
| 5,394,741 | 3/1995 | Kajimura et al. | 73/105 |
| 5,406,833 | 4/1995 | Yamamoto | 73/105 |
| 5,440,920 | 8/1995 | Jung et al. | 73/105 |
| 5,463,897 | 11/1995 | Prater et al. | 73/105 |
| 5,481,908 | 1/1996 | Gamble | 73/105 |
| 5,496,999 | 3/1996 | Linker et al. | 250/306 |
| 5,524,479 | 6/1996 | Harp et al. | 73/105 |
| 5,560,244 | 10/1996 | Prater et al. | 73/105 |
| 5,569,918 | 10/1996 | Wang | 250/306 |
| 5,587,523 | 12/1996 | Jung et al. | 73/105 |
| 5,625,142 | 4/1997 | Gamble | 73/105 |

OTHER PUBLICATIONS

B. Gasser et al.; "Design of a 'Beetle–Type' Atomic Force Microscope Using The Beam Deflection Technique"; May 1996; pp. 1925–1929; Rev. Sci. Instruments 67(5).

Kees. O. Van Der Werf et al.; "Compact Stand–Alone Atomic Force Microscope", Oct. 1993; pp. 2892–2897; Rev. Sci. Instruments 64(10).

Steven M. Clark et al.; "A High Performance Scanning Force Microscope Head Design"; Apr. 1993; pp. 904–907; Rev. Sci. Instruments 64(4).

David R. Baselt et al.; "Scanned–Cantilever Atomic Force Microscope"; Apr. 1993; pp. 908–911; Rev. Sci. Instruments 64(4).

P.S. Jung et al.; "Novel Stationary–Sample Atomic Force Microscope With Beam–Tracking Lens"; 4 Feb. 1993; pp. 264–266; Eletronic Letters vol. 29 No. 3.

Y. Martin et al.; "Atomic Force Microscope–Force Mapping and Profiling on a Sub 100–Å Scale"; 15 May 1987; pp. 4723–4729; J. of Appl. Physics 61(10).

*Primary Examiner*—Hezron Williams
*Assistant Examiner*—Daniel S. Larkin

[57] ABSTRACT

A scanning force microscope employs a laser (76) which creates a laser beam (26). The laser and a probe assembly (24) are mounted in a removable probe illuminator assembly (22). The removable probe illumination assembly is mounted to the moving portion of a scanning mechanism. The scanning mechanism creates relative movement between the probe illuminator assembly and a sample (28). The removal of the probe illuminator assembly permits alignment of said laser beam onto a cantilever (30) after removal of said illuminator assembly from the microscope. This prevents damage to, and shortens alignment time of, the microscope during replacement and alignment of the probe assembly.

21 Claims, 8 Drawing Sheets

SCANNING FORCE MICROSCOPE WITH REMOVABLE PROBE ILLUMINATOR ASSEMBLY

BACKGROUND

1. Field of the Invention

This invention relates to scanning force microscopes, sometimes referred to as atomic force microscopes, where such microscopes use light beam detection schemes.

2. Description of Prior Art

Scanning force microscopes can resolve features of matter to the atomic level. Scanning force microscopes also are members of one class of a broader category of probe microscopes. When used to image the topography of a sample, the scanning force microscope uses a finely pointed stylus to interact with a sample surface. A scanning mechanism creates relative motion between the stylus and the sample surface. When a measurement of the interaction of the stylus and surface is made, the surface topography of the sample can be imaged in height as well as in the lateral dimensions. Other classes of probe microscopes may use different types of probes to measure sample features other than topography. For example, the interaction of a magnetic probe with the sample may create an image of the magnetic domains of the sample.

Scanning force microscopes used to image topographical features have the stylus mounted orthogonally to the longer dimension of a cantilever. A cantilever is a lever constrained on one end with the other end free to move. The stylus is attached to the free end, and the cantilever will, therefore, deflect, or bend, when forces are applied to the stylus. In force microscopes, the forces acting on the stylus are the result of the interaction of the stylus with the sample surface. The combination of a stylus, cantilever, and inseparable cantilever supporting elements creates a probe assembly. The cantilever, used in a scanning force microscope, has a very weak spring constant and deflects or bends noticeably when forces as small as one nano-newton are applied to the free end. Operation also requires that a detection mechanism provide a signal when the cantilever deflects. This signal is then processed by a feedback loop to create a feedback signal. A vertical drive mechanism moves the fixed end of the cantilever toward and away from the sample surface. This vertical drive mechanism receives the feedback signal and maintains the free end of the cantilever surface at a nearly constant bend angle as detected by the detection mechanism.

A lateral drive mechanism creates relative lateral motion between the stylus and sample. This relative lateral motion between the stylus and the surface creates lateral and vertical forces on the stylus as it interacts with surface features passing under the stylus during scanning. The lateral force applies torque to the stylus and cantilever. The vertical force on the stylus causes the cantilever free end to deflect vertically. The known lateral position of the stylus over the sample can be expressed in terms of x and y coordinates. The vertical deflection of the cantilever defines a height or z value. The x and y coordinates create a matrix of z values which describe the surface topography of the sample. The scanning mechanism is comprised of the vertical and lateral drive mechanisms.

In order to detect the cantilever deflections, a laser beam is directed onto the free end of the cantilever opposite the surface supporting the stylus. The surface illuminated by the laser beam is at least partially reflecting. By measuring the position of the reflected beam, the deflection of the free end of the cantilever is determined. A vertical array of two light-sensitive devices detects the position of the reflected beam. These devices produce electrical signals that represent the bend angle of the free end of the cantilever. The difference of the two signals created by the two light-sensitive devices is proportional to the amount of the cantilever deflection in the vertical direction. By using four light-sensitive devices in a quadrant array, both the cantilever twist and cantilever vertical deflection can be measured. The vertical drive mechanism receives signals processed from the vertical component of the output of the light-sensitive devices.

In probe microscopes, it is often necessary to replace the probe assembly. This may result from a blunted stylus tip caused either by wear of, or by small particles that adhere to, the tip as it scans over the sample. Also, the stylus or the cantilever or both can break necessitating replacement of the probe assembly. When the probe assembly is replaced, the new cantilever often is not in exactly the same position as the previous cantilever relative to the laser and associated optics. Adjustment of either the laser beam angle or the probe assembly position is then required. Alignment mechanisms restore the beam its proper position on the reflecting surface of the cantilever.

The initial adjustment of the laser beam onto the cantilever can be accomplished in various ways. See, for example, copending application titled "Scanning Force Microscope and Method for Beam Detection and Alignment" by Ray.

Prior art devices are shown in U.S. Pat. No. 4,935,634 to Hansma et, al, and U.S. Pat. No. 5,144,833 to Amer et, al. These prior art devices move the sample laterally and vertically under a stationary stylus while detecting the cantilever deflection with the laser beam apparatus described above. This method has a disadvantage stemming from the limited force capability of the lateral and vertical drive mechanisms. The sample mass may be large compared to the force created by the drive mechanisms. It is then possible that the sample will move very slowly or not at all under the stylus. The mechanical resonance of the scanning mechanism is also undesirably low with large moving mass.

Other prior art microscopes as recited in U.S. Pat. No. 5,496,999 to Linker et. al. and U.S. Pat. No. RE 35,514 to Albrecht et. al. have removable assemblies comprising laser, cantilever, and adjustment mechanisms mounted to the fixed reference frame of the microscope base. But, these microscopes also have the disadvantage as described above in that they move the sample under the stationary stylus. Further, the assemblies are too massive to be mounted to the scanning mechanism since they are designed to allow adjustment of the beam path or probe position while the assembly is mounted to the microscope.

Prior art microscopes are also described in U.S. Pat. No. 5,481,908 and its continuation U.S. Pat. No. 5,625,142 to Gamble. These microscopes maintain a fixed sample and move the laser, the cantilever, and all of the associated mechanisms necessary to make initial adjustment of the laser beam. Since the laser moves with the cantilever, the laser beam follows the motion of the cantilever during scanning. The mass associated with the moving part of these microscopes limits the rate of image data collection.

Other prior art microscopes attempt to overcome the disadvantage of moving the sample by using an interferometric method to track a moving cantilever. These microscopes are described in U.S. Pat. No. 5,025,658 and its continuation U.S. Pat. No. 5,189,906 to Elings et al. This approach suffers from false signals received by the interferometer as a result of light reflected from the sample surface.

Still other prior art microscopes use moving beam steering optics with a stationary laser source as described in U.S. Pat. Nos. 5,524,479 and continuation of U.S. Pat. No. 5,388,452 to Harp and Ray and in U.S. Pat. No. 5,463,897 with associated continuation U.S. Pat. No. 5,560,244 to Prater et. al. as well as U.S. Pat. Nos. 5,440,920 and its continuation 5,587,523 to Jung et. al. These techniques employ a fixed position laser and optical elements that move in conjunction with the moving probe assembly. As a result of the moving optical elements the laser beam experiences a refraction such that it more or less follows the reflecting surface of the moving cantilever. These microscopes show noticeable deficiencies when the probe assembly must be replaced. The initial alignment of the laser beam through the optics and onto the newly installed cantilever can be time consuming and tedious. This approach does not readily lend itself to industrial environments.

Rather than aligning the laser, it is possible to place a low mass operator controlled adjustment mechanism on the moving end of the drive mechanisms to reposition the probe assembly. The probe assembly then can be aligned with the laser beam. However, the vertical and lateral drive mechanisms often consist of thin walled piezoelectric tubes and such tubes are quite fragile. The operator may apply too much force when adjusting the probe holding mechanism attached to the tubes thus damaging or breaking the tubes during the alignment process. Also, the alignment process can still be tedious.

Other prior art attempts such as U.S. Pat. No. 5,496,999 to Linker et. al. use precision mounting of the probe assembly on the microscope. By carefully machining the parts to high tolerances, it is possible to bring the probe into near alignment with the laser light source. This method generally results in higher costs and normally still results in the need for a final small adjustment of the laser beam or probe position.

OBJECTS AND ADVANTAGES

My scanning force microscope with removable probe illuminator assembly offers advantages over the prior art in the following respects:

(b) the laser and probe compose an illuminator assembly that is conveniently removable from the vertical and lateral drive mechanisms in case of failure of the laser;

(a) the illuminator assembly with prealigned laser and probe assembly can be replaced on the microscope and the microscope is ready for immediate operation without tedious alignment of the laser or probe assembly;

(c) adjustment of the laser beam is accomplished while the probe illumination assembly is removed from the microscope thereby preventing damage to the vertical and lateral drive mechanisms during the alignment process;

(d) during scanning the laser beam accurately tracks the motion of the probe assembly.

(e) the removal and replacement of the illuminator assembly can be automated.

SUMMARY OF THE INVENTION

The scanning force microscope described below has a low mass laser and a probe assembly mounted in a conveniently removable probe illuminator assembly. The illuminator assembly is connected to the moving portion of the scanning mechanism and is, therefore, in the moving reference frame of the microscope. The laser and probe assembly move as a unit, and the laser beam unerringly tracks the cantilever during scanning. When replacing the probe assembly, the operator easily and conveniently removes the probe illuminator assembly from the microscope. The illuminator assembly is then replaced with a new prealigned illuminator assembly. Further, the probe assembly may be replaced in the just removed illuminator assembly and aligned without damage to the microscope scanning mechanism.

DESCRIPTION OF THE INVENTION WITH REFERENCE TO THE DRAWINGS

Figure 1:
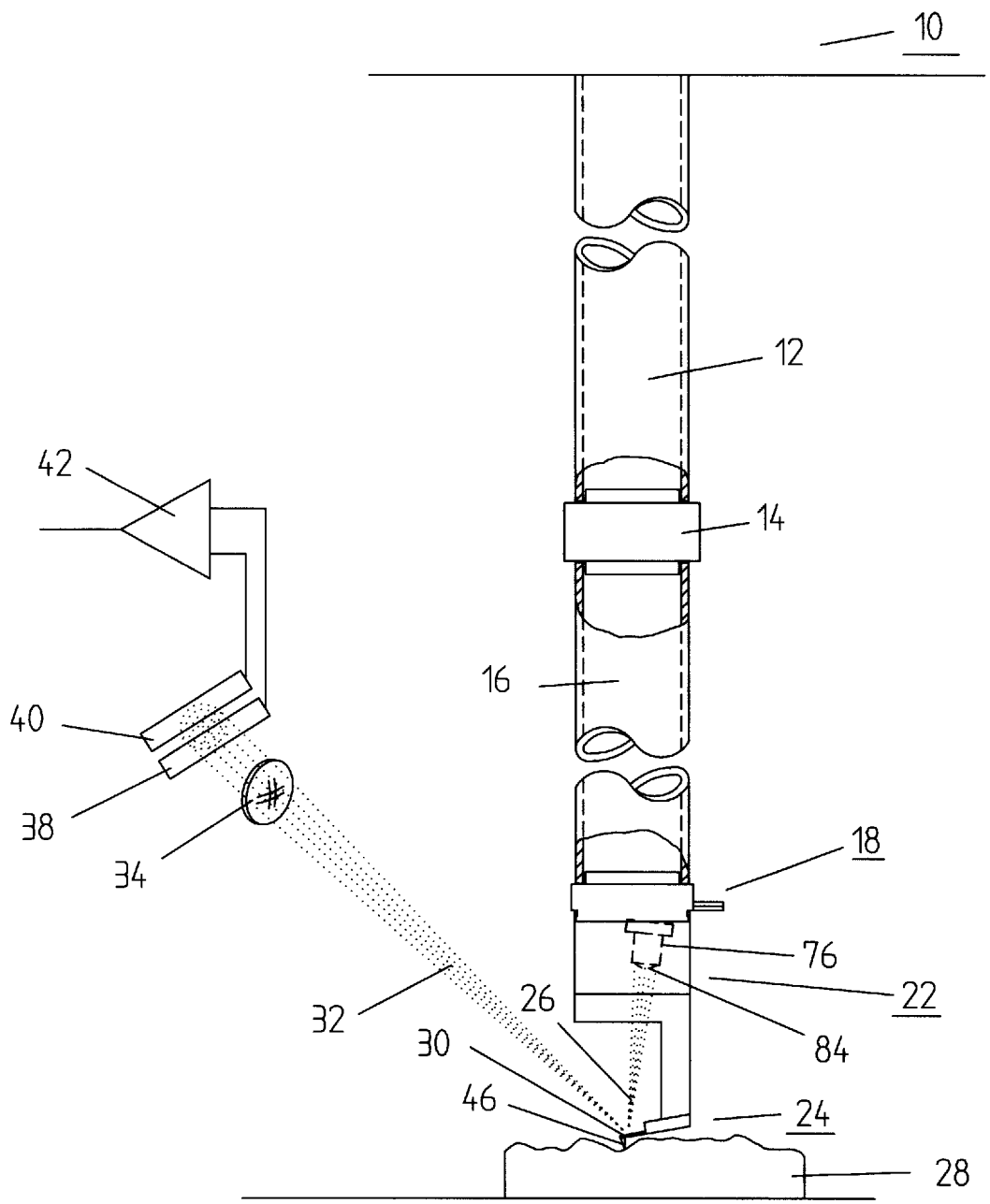
FIG. 1 shows a scanning force microscope employing a first embodiment of the invention in which a removable probe illuminator assembly is attached to a scanning mechanism by means of a receiver assembly.

FIG. 1 describes a preferred embodiment of the invention. A microscope frame 10 supports a lateral driver 12 coupled to a vertical driver 16 by a coupler 14. Vertical driver 16 supports a receiver assembly 18. A removable probe illuminator assembly 22 supports a laser 76 with a laser focusing lens 84 and a probe assembly 24 detailed in FIG. 1A. Probe illuminator assembly 22 is described in FIG. 2. Laser 76 creates a laser beam 26. Laser beam 26 reflects off a cantilever 30, which supports a stylus 46, to form a reflected beam 32. Stylus 46 follows the topography of a sample 28. Reflected beam 32 passes through a beam sizing lens 34 and impinges on a first photodiode 38 or a second photodiode 40 or both. A difference amplifier 42 receives the output signals from photodiodes 38 and 40. Beam sizing lens 34 is optional and either increases or decreases the diameter of the beam to a value that matches the light sensitive areas of photodiodes 38 and 40 as necessary. The focal lengths and positions of lenses 84 and 34 are calculated to sufficient accuracy using the thin lens formula:

$$\frac{1}{f} = \frac{1}{s} + \frac{1}{s'},$$

where f is the focal length of the lens, s is the object distance to the lens, and s' is the desired distance from the lens to the image. The appropriate sign conventions must be followed when making the calculations.

Figure 1A:
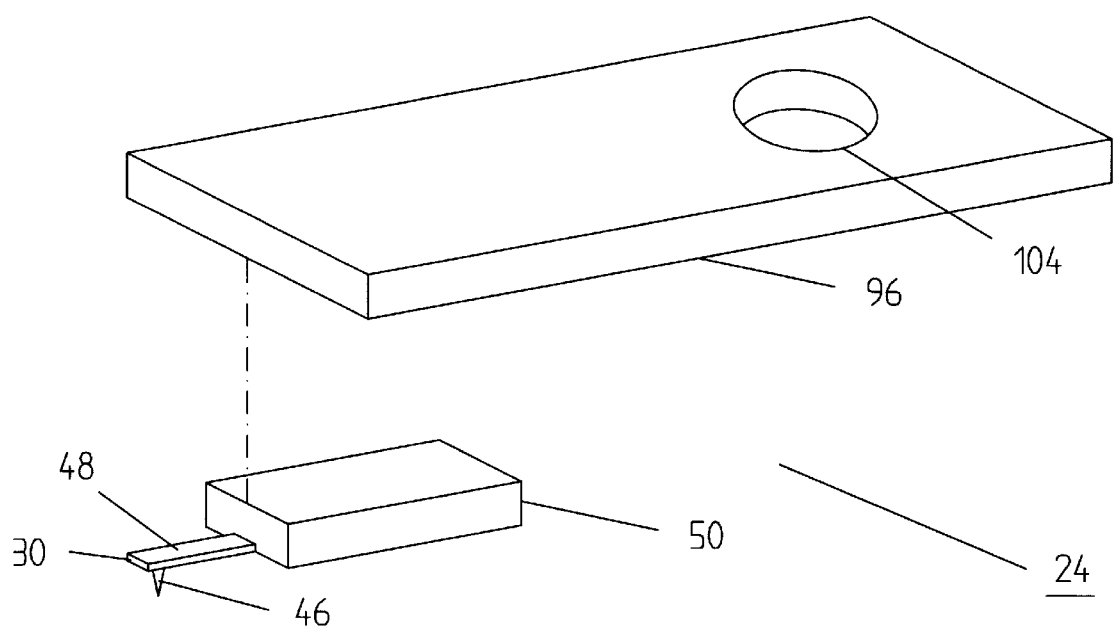
FIG. 1A shows a typical probe assembly.

FIG. 1A shows probe assembly 24 with a die 50 which supports cantilever 30. Cantilever 30 has an upper surface 48 which is at least partially reflecting. The cantilever surface opposite surface 48 supports stylus 46. Cantilever 30 has a weak spring constant and will deflect measurably with as little as one nanonewton of force applied to stylus 46. Die 50 is attached to a tab 96 with an adhesive (not shown). Tab 96 has a tab alignment hole 104.

Figure 2:
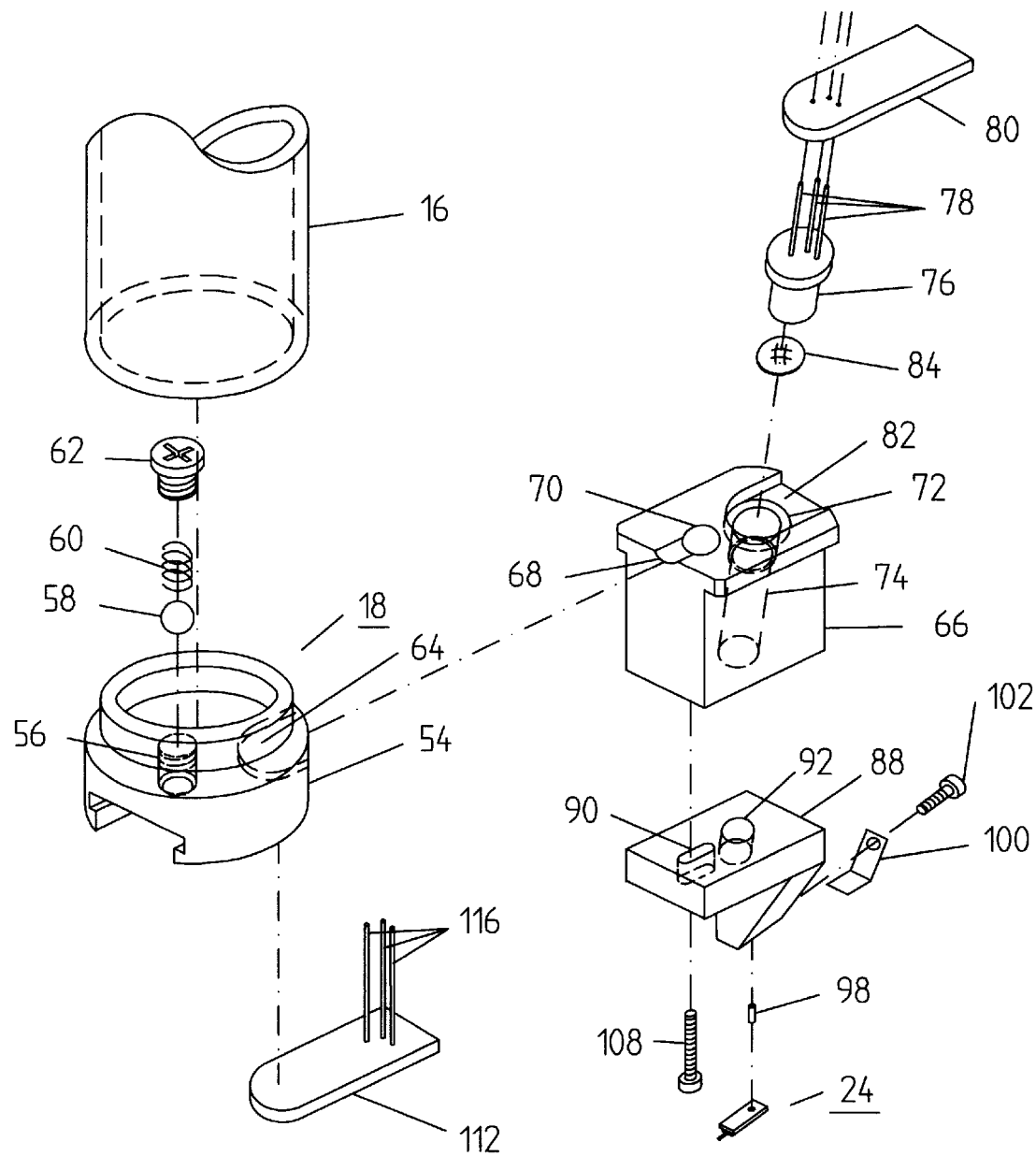
FIG. 2 shows the detail of a first embodiment of a removable probe illuminator assembly.

FIG. 2 describes, in detail, the relationship of vertical driver 16 to receiver assembly 18 and associated parts. Receiver assembly 18 comprises a receiver 54 with a receiver bore 56 which becomes smaller at its lower end. A receiver ball 58 and a receiver spring 60 are held captive in receiver bore 56 by a receiver spring cap 62. A receiver board 112 has three receiver board leads 116 attached. Receiver board 112 is attached flush in a receiver groove 64 with adhesive (not shown).

A laser holder 66 has a laser bore 72 which penetrates holder 66 at an angle to its top surface. A laser beam throughbore 74 is smaller than and coaxial with bore 72 and continues through to the lower surface of laser holder 66. The top surface of laser holder 66 has a holder groove 68 and a detent hole 70. Laser 76 is inserted into laser bore 72. Lens 84 may be an integral part of laser 76 or may be mounted in laser holder 66. Laser 76 has laser leads 78. Laser leads 78 are attached to a laser board 80. When laser 76 is inserted into laser bore 72 laser board 80 fits flush into a laser board slot 82.

A probe holder 88 has a through slot 90 through which a probe holder screw 108 is inserted and a probe holder throughbore 92. Probe holder screw 108 screws into laser holder 66 to hold probe holder 88 onto laser holder 66. Probe holder 88 supports a tab pin 98. A tab clamp 100 clamps probe assembly 24 to probe holder 88. Probe assembly 24 is positioned such that tab pin 98 penetrates tab alignment hole 104 shown in FIG. 1A. A tab clamp screw 102 attaches tab clamp 100 to probe holder 88.

Figure 3:
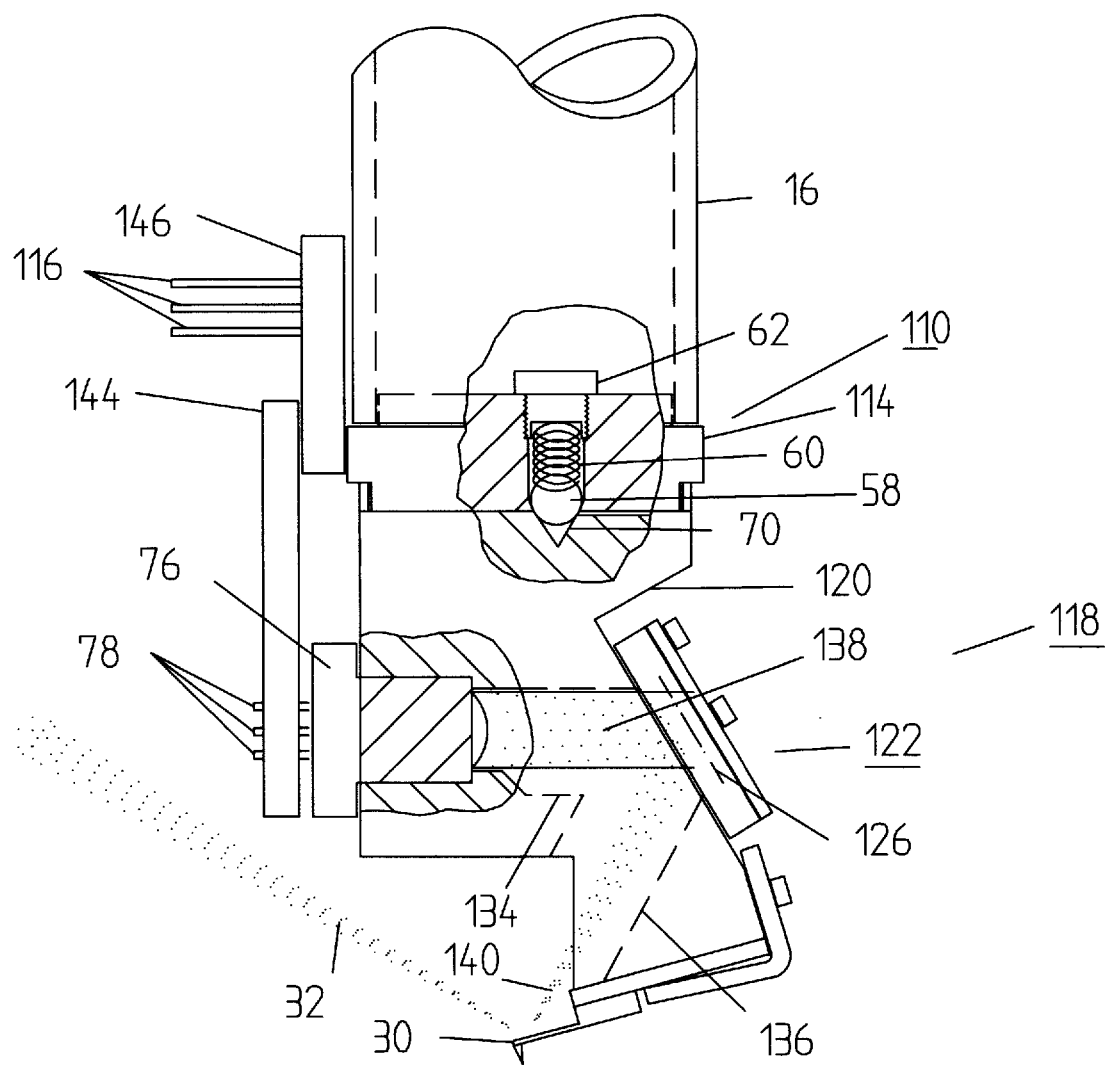
FIG. 3 shows a second embodiment of a removable probe illuminator assembly.

FIG. 3 describes an arrangement of an alternate receiver assembly 110 which receives a laser assembly 118. Assembly 110 is attached to vertical driver 16 and consists, in part, of an alternate receiver 114 and of a receiver vertical board 146 which has receiver board leads 116. Receiver assembly 110 also contains ball 58, spring 60, and cap 62. Laser assembly 118 has a laser mirror probe holder 120. Holder 120 supports laser 76 which in turn supports a laser vertical board 144 by way of laser leads 78. Holder 120 further has a laser throughbore 134 to allow an emitted beam 138 to pass through holder 120 and impinge on a mirror surface 126. Mirror surface 126 is part of a mirror assembly 122 described in detail in FIG. 3A. A reflected beam segment 140 reflects from mirror surface 126 and passes through a mirror throughbore 136. Reflected beam segment 140 then impinges on cantilever 30 and reflects a second time to form reflected beam 32.

Figure 3A:
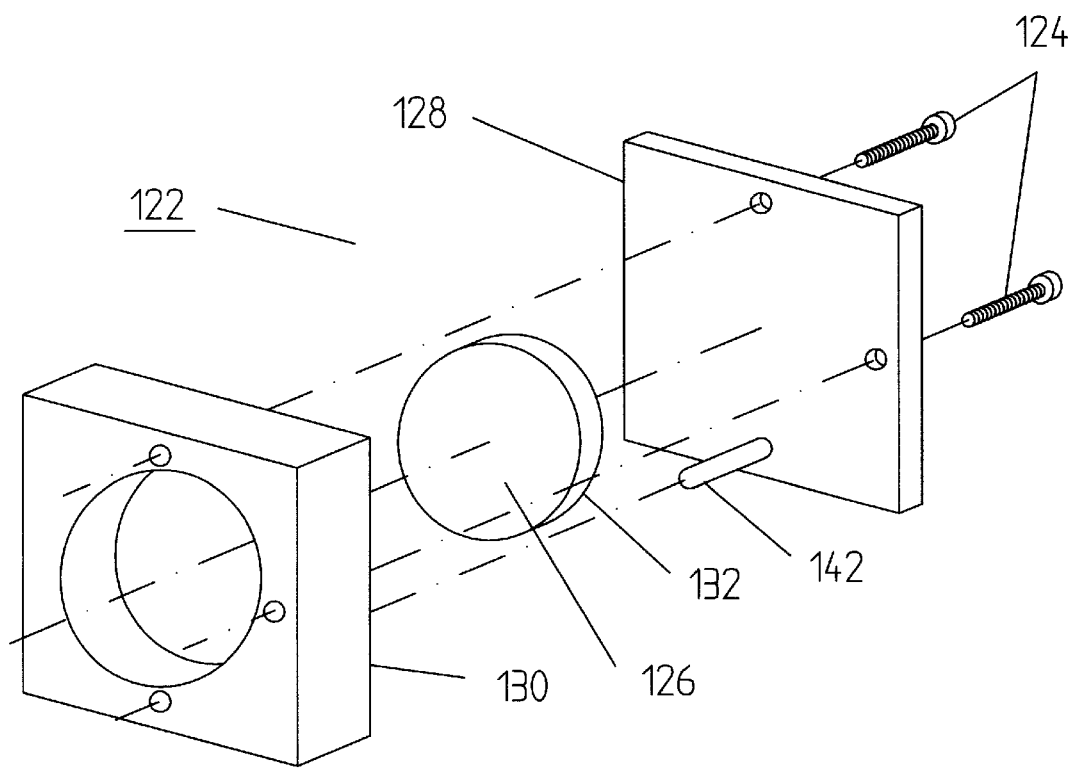
FIG. 3A shows an adjustable mirror assembly.

FIG. 3A provides the details of mirror assembly 122. A mirror plate 128 has an attached pivot pin 142. A mirror 132 is also attached to plate 128 with an adhesive (not shown). An elastic pad 130 is positioned against plate 128. Assembly 122 is fastened to laser mirror probe holder 120 shown in FIG. 3 by mirror adjustment screws 124.

Figure 4:
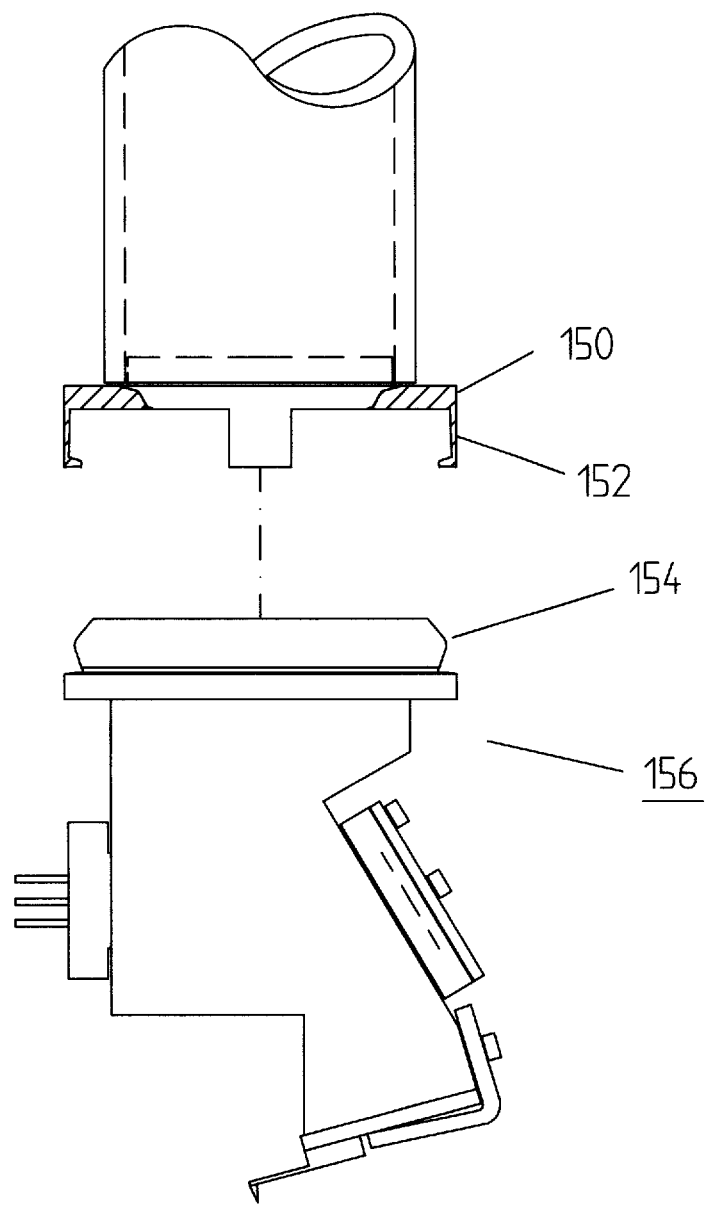
FIG. 4 shows an insertion type of connection.

FIG. 4 shows an insertion and extraction device for attachment and detachment. A tang receiver 150 has four tangs 152 located circumfrentially around tang receiver 150. A flange assembly 154 has a circular flange 156 around its top surface. Tang receiver 150 is made of a material which provides for elastic displacement of tangs 152. As flange assembly 154 is pressed against tang receiver 150, tangs 152 displace slightly in a radial direction and then spring back in to capture flange assembly 154.

Figure 5:
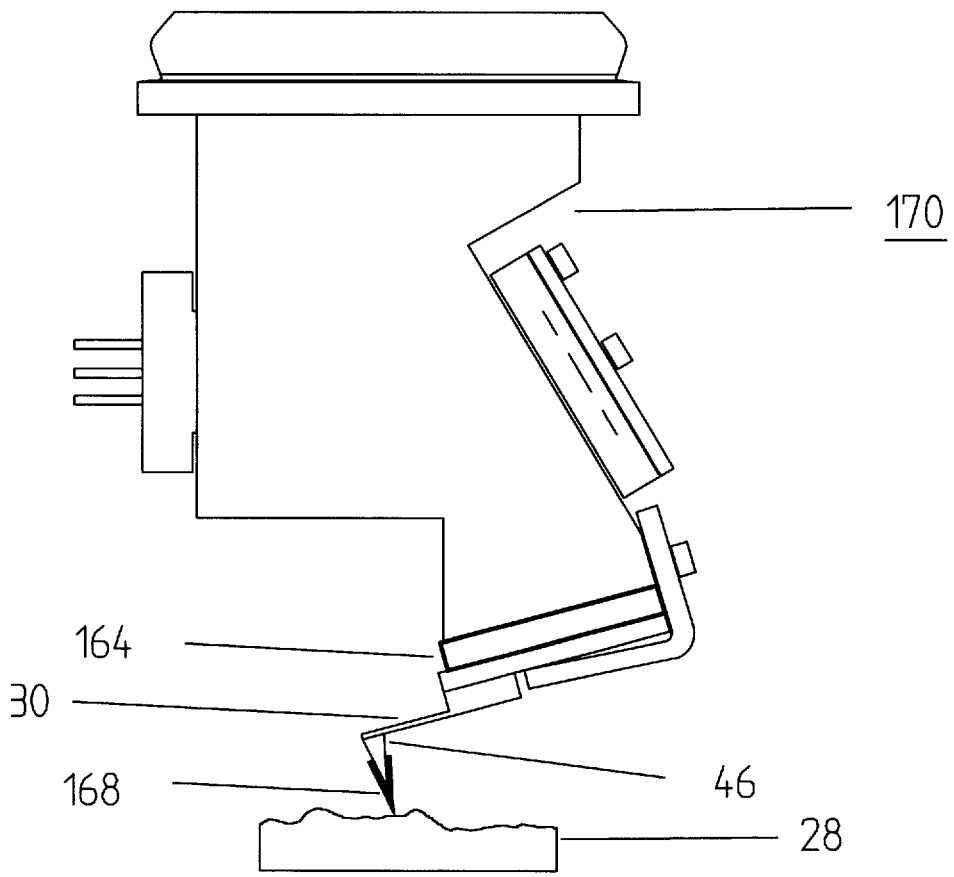
FIG. 5 shows a third alternate embodiment with an oscillator device and a magnetic sensor.

FIG. 5 shows an a third alternate probe illuminator assembly 170 that supports a conventional oscillator device 164. Cantilever 30 supports stylus 46. Stylus 46 may be composed of, or coated with a conventional magnetic sensing material 168. Stylus 46 is disposed on or near sample 28.

Figure 6:
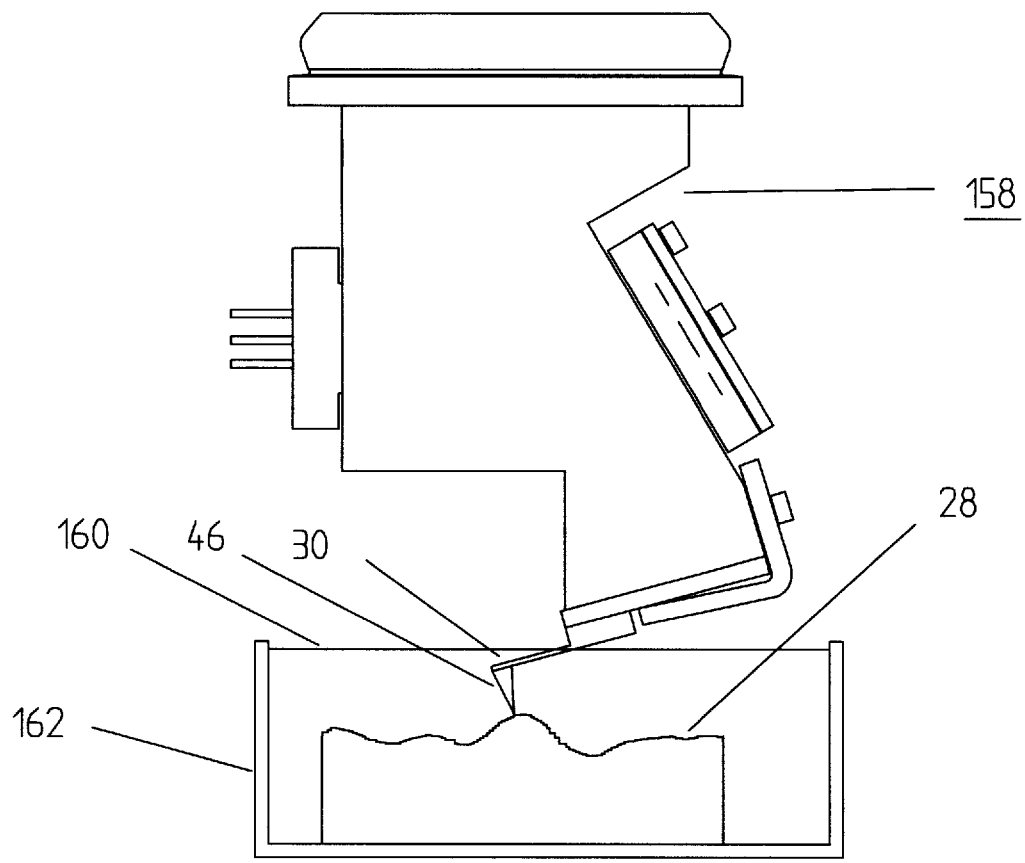
FIG. 6 shows a fourth alternate embodiment with a stylus in fluid.

FIG. 6 shows a fourth alternate probe illuminator assembly 158 with cantilever 30 and a conventional sample and fluid container 162. Container 162 contains a conventional fluid 160 and sample 28.

OPERATION OF THE INVENTION

The operation of the present scanning force microscope may be understood by referring to FIG. 1. Lateral driver 12 is fixed at the upper end to microscope frame 10, but its lower end can move laterally. All parts attached to the lower end appear to pivot about a point approximately at the midpoint along the length of lateral driver 12. Consequently, coupler 14, vertical driver 16, receiver assembly 18, and removable probe illuminator assembly 22 move laterally. Stylus 46 therefore, moves laterally across the surface of sample 28.

Laser 76 also moves laterally and directs laser beam 26 at cantilever 30. Since laser 76 is in the same moving frame of reference as cantilever 30 laser beam 26 constantly follows the movement of cantilever 30. Focusing lens 84 focuses beam 26 to an approximate point on cantilever 30.

As stylus 46 encounters changing topography during its lateral scan, it applies force to cantilever 30 causing minute deflections of cantilever 30. The deflections cause reflected beam 32 to change direction and impinge at different locations on photodiodes 38 and 40 changing their electrical outputs. Difference amplifier 42 then outputs the changes. Difference amplifier 42 output is routed to a feedback signal processor (not shown) and then to vertical driver 16. Vertical driver 16 then expands and contracts along its length in response to the processed electrical signals thus causing the deflection of cantilever 30 to return to its preset position. Beam sizing lens 34 is optional and increases or decreases the spot size of the beam to a value that matches the size of photodiodes 38 and 40 as necessary.

When probe assembly 24 is replaced, the new probe assembly must be installed in precise alignment with laser 76. Since probe illuminator assembly 22 is conveniently removable from receiver assembly 18, the alignment may be accomplished with assembly 22 removed from the entire microscope. Since the assembly is removed from the microscope, alignment may be facilitated by jigs and tools. Complete illuminator assemblies are relatively inexpensive, and when one is removed it may be replaced from a set of prepared illuminator assemblies that have already been aligned. The removed assembly may then be recycled and refitted with a new probe assembly as described above.

FIG. 2 shows the operation of receiver assembly 18 and removable probe illuminator assembly 22. Assembly 22 contains laser holder 66. Laser holder 66 slides laterally into receiver 54. When holder 66 is in position in receiver 54, the force from receiver spring 60 presses receiver ball 58 into detent hole 70. Laser holder 66 is then held gently but firmly to receiver 54. A slight lateral force in a direction along the axis of laser holder groove 68 will release assembly 22 from receiver assembly 18. Laser board 80 and receiver board 112 make electrical contact and provide power to laser 76 via laser leads 78 and receiver board leads 116.

In order to provide precise alignment of laser 76 and probe assembly 24, assembly 24 is mounted to probe holder 88 by way of probe holder screw 108 and slot 90. By loosening screw 108, probe holder 88 moves laterally with reference to laser holder 66 in the direction of slot 90 and pivots around screw 108. This procedure is accomplished while assembly 22 is removed from the microscope.

Probe assembly 24 is conveniently removed from probe holder 88 by applying slight pressure to tab 100 and slipping probe assembly 24 off tab pin 98.

In reference to FIG. 3, the operation of alternate removable illuminator assembly can be seen. Holder 120 slides laterally into alternate receiver assembly 110 in much the same manner as in FIG. 2, except that holder 120 slides into receiver assembly 110 from left to right. Again, receiver ball 58 presses into detent hole 70 allowing laser assembly 118 to be installed and removed with slight lateral pressure.

In this alternate assembly, laser 76 is aligned in a lateral direction such that emitted beam 138 impinges on mirror surface 126 and results in reflected beam segment 140. The angle of mirror surface 126 can be changed to redirect beam segment 140 onto cantilever 30 as in FIG. 3.

A source of electrical power (not shown) is connected to receiver board leads 116. As assembly 118 slides into receiver assembly 110, laser vertical board 144 presses against receiver vertical board 146 making electrical contact between laser leads 78 and receiver board leads 116. This connection provides electrical power to laser 76.

FIG. 3A shows how the angle of mirror surface 126 is adjusted. Elastic pad 130 is sandwiched between mirror plate 128 and holder 120. Mirror plate 128 compresses elastic pad 130 when screws 124 are tightened. Consequently, mirror 132 will rotate about the point where the end of pivot pin 142 and holder 120 meet.

Referring to FIG. 5, oscillator device 164 causes stylus 46 to vibrate and periodically approach and withdraw from sample 28 in a conventional manner. Magnetic sensing material 168 senses any magnetic fields emanating from sample 28. The interaction of sensing material 168 and any magnetic fields from sample 28 causes cantilever 30 to deflect.

Referring to FIG. 6, sample 28 is submersed in conventional fluid 160. Both sample 28 and fluid 160 are contained in fluid container 162. Alternate probe illuminator assembly 158 is positioned such that cantilever 30 and stylus 46 are submersed in fluid 160 in a conventional manner.

SUMMARY, RAMIFICATIONS, AND SCOPE

The scanning force microscope just described attaches the illuminator assembly to the moving portion of the scanning mechanism and provides easy installation on, and removal from, the microscope. The cantilever can then be replaced on the removed assembly without stressing or contaminating the lateral or vertical drive mechanisms. The laser beam can also be conveniently aligned while the assembly is removed from the microscope thereby avoiding damage to the lateral or vertical drive mechanisms. After installation of the prealigned illuminator assembly on the microscope, the light beam accurately tracks the motion of the cantilever as it scans over the surface of the sample. Further, the use of low mass components in the illuminator assembly, reduces the mass of the moving elements and the system is able to scan at a faster rate.

The description given above is quite specific and detailed. It should not limit the scope of the invention but should instead be viewed as only a description of some examples of the invention. There are many alternate variations of the invention.

The connection mechanism for the illuminator assembly may be made as shown above using a lateral or vertical slide operation. Connection may also be made by lateral or vertical insertion or by a combination of sliding and rotating or insertion and rotation.

The scanning mechanism can take many forms. The vertical and lateral drivers can be piezoelectric blocks, stacks, tubes, bimorphs, or flexures. Piezoelectric devices can actuate the vertical and lateral drivers. Magnetic or magnetostrictive devices can also be used as such drivers. The vertical and lateral drivers can be combined into a single piezoelectric tube which can create relative motion in the x, y, and z direction with respect to the sample surface.

The light source can be a laser, a light emitting diode, or an incandescent source. The examples show the reflected beam location detectors as photodiodes, but there are other types of devices that can detect light. Consequently, the light detecting devices can be phototransistors. If an array of four or more light detecting devices is employed, the lateral motion of the beam as well as the vertical motion can be detected.

The detector assembly with its associated light sensitive devices may also be mounted to the illuminator assembly such that there is no need to align the detector assembly after installation of the illuminator assembly. This added benefit comes at the cost of increased mass of the moving portion of the microscope and would, to some extent, limit the scanning speed of the microscope.

The scanning force microscope described here can operate with the sample submerged in fluids. Further, the microscope can operate by oscillating the cantilever and detecting some parameter of the oscillation such as the amplitude, frequency, or phase change. The oscillating cantilever may actually come into intermittent contact with the sample surface.

In the examples, a stylus creates a bending action of the cantilever. However, other types of probes, such as magnetic probes, can bend the cantilever.

Thus the scope of the invention should be determined by the appended claims and their legal equivalents, rather than by the examples given.

I claim:

1. A scanning force microscope comprising:
   (a) a light source,
   (b) a cantilever,
   (c) an illuminator assembly comprising said light source and said cantilever, and
   (d) scanning means for moving said illuminator assembly relative to a sample, where said illuminator assembly is removable from said scanning means, and where said light source directs a light beam onto said cantilever.

2. The scanning force microscope of claim 1 further including a stylus attached to said cantilever, and where said cantilever deflects as a result of forces acting on said stylus where said forces result from the proximity of said stylus to said sample.

3. The scanning force microscope of claim 1 further including magnetic field sensing means attached to said cantilever, and where said cantilever deflects as a result of forces created by the interaction of said magnetic field sensing means and said sample.

4. The scanning force microscope of claim 1 where said scanning means includes at least one piezoelectric tube.

5. The scanning force microscope of claim 1 where said light source receives electrical power through a first set of at least two electrical conductors and a second set of at least two electrical conductors, where said first set of at least two electrical conductors is fixed to said scanning means, and makes electrical contact with said second set of at least two electrical conductors where said second set of at least two electrical conductors are fixed to said illuminator assembly.

6. The scanning force microscope of claim 1 further including a sample where said cantilever comprises a stylus mounted on one surface of said cantilever and during scanning said stylus intermittently contacts said sample.

7. The scanning force microscope of claim 1 further including a sample where said sample and said cantilever are immersed in a fluid during scanning.

8. The scanning force microscope of claim 1 further including adjusting means where said adjusting means alters the position of said cantilever relative to said light source.

9. The scanning force microscope of claim 1 where said illuminator assembly is slidably removable from said scanning means.

10. A scanning force microscope comprising:
   (a) a light source for creating a light beam,
   (b) a cantilever which reflects said light beam resulting in an at least partially reflected light beam,
   (c) an illuminator assembly comprising said light source, said cantilever, and containing at least one device selected from the group consisting of lenses, mirrors, and prisms, and
   (d) scanning means for moving said illuminator assembly relative to a sample; where said illuminator assembly is attached to and, removable from, said scanning means.

11. The scanning force microscope of claim 10 further including extraction means where said illuminator assembly is removable from said scanning means by said extraction means.

12. The scanning force microscope of claim 10 where said scanning means consists of at least one piezoelectric tube.

13. The scanning force microscope of claim 10 further comprising adjustment means where at least one device in said illuminator assembly is adjustable such that said light beam can be adjusted to impinge on said cantilever.

14. The scanning force microscope of claim 10 further including a beam sizing lens which changes the diameter of said at least partially reflected light beam.

15. The scanning force microscope of claim 10 further including a light beam position detector where said light beam position detector includes at least two light detecting devices.

16. The scanning force microscope of claim 15 further including means for oscillating said cantilever and where said light beam position detector senses a change in said partially reflected beam where said change results from oscillations of said cantilever.

17. The scanning force microscope of claim 10 where said cantilever is immersed in a fluid during scanning.

18. The scanning force microscope of claim 10 where said illuminator assembly is slidably removable from said scanning means.

19. The scanning force microscope of claim 10 where said illuminator assembly is fastened to said scanning means by means of a spring loaded device.

20. The scanning force microscope of claim 10 further including a lens where said lens brings said light beam to a focus approximately at said cantilever.

21. The method of changing a cantilever of a scanning force microscope comprising the steps of:
   (a) removing an illuminator assembly from scanning means of said scanning force microscope,
   (b) removing said cantilever from said illuminator assembly,
   (c) installing a replacement cantilever in said illuminator assembly, and
   (d) installing said illuminator assembly into said scanning means of said scanning force microscope.

* * * * *